United States Patent [19]

Chun

[11] Patent Number: 5,737,021

[45] Date of Patent: Apr. 7, 1998

[54] TRANSFORM COEFFICIENT SELECTION METHOD AND APPARATUS FOR A TRANSFORM CODING SYSTEM

[75] Inventor: Kang-wook Chun, Seoul, Rep. of Korea

[73] Assignee: Samsung Electronics Co., Ltd., Kyungki-Do, Rep. of Korea

[21] Appl. No.: 778,751

[22] Filed: Jan. 6, 1997

[30] Foreign Application Priority Data

Jan. 6, 1996 [KR] Rep. of Korea ............... 96-165

[51] Int. Cl.$^6$ ............................................. H04N 7/50
[52] U.S. Cl. ............................................. 348/408
[58] Field of Search ............................. 348/399, 403, 348/408, 402, 407, 413, 416; H04N 7/50

[56] References Cited

U.S. PATENT DOCUMENTS

| | | | |
|---|---|---|---|
| 4,442,454 | 4/1984 | Powell | 348/408 |
| 4,751,742 | 6/1988 | Meeker | 348/408 |
| 5,006,931 | 4/1991 | Shirota | 348/408 |
| 5,144,425 | 9/1992 | Joseph | 348/408 |
| 5,321,440 | 6/1994 | Yanagihara | 348/408 |
| 5,355,167 | 10/1994 | Juri | 348/408 |
| 5,365,271 | 11/1994 | Asano | 348/408 |
| 5,410,308 | 4/1995 | Keeson | 348/408 |
| 5,444,489 | 8/1995 | Truong | 348/408 |
| 5,570,132 | 10/1996 | De With | 348/408 |
| 5,614,952 | 3/1997 | Boyce | 348/408 |
| 5,654,706 | 8/1997 | Jeong | 348/408 |

*Primary Examiner*—Howard W. Britton
*Attorney, Agent, or Firm*—Sughrue, Mion, Zinn, Macpeak & Seas, PLLC

[57] ABSTRACT

A transform coefficient selection method and apparatus for coding a still image and a motion image in a transform coding system are provided, which can receive an input block and far better enhance a quality of picture of a restored image by selecting a predetermined number of transform coefficients taking into account an amount of variation of blocks due to an error between a block restored by a local decoder for each transform coefficient and the input block and an amount of variation of bits generated by selecting each transform coefficient.

10 Claims, 4 Drawing Sheets

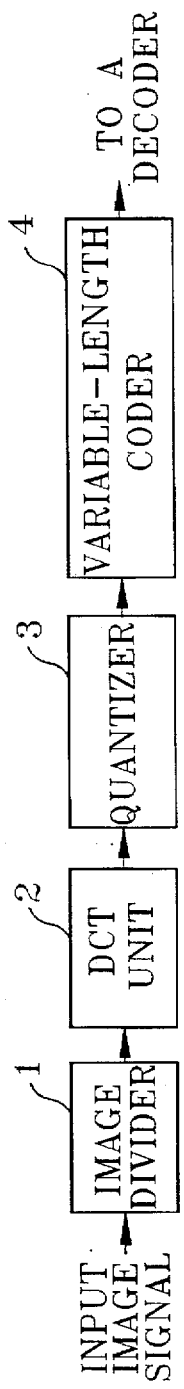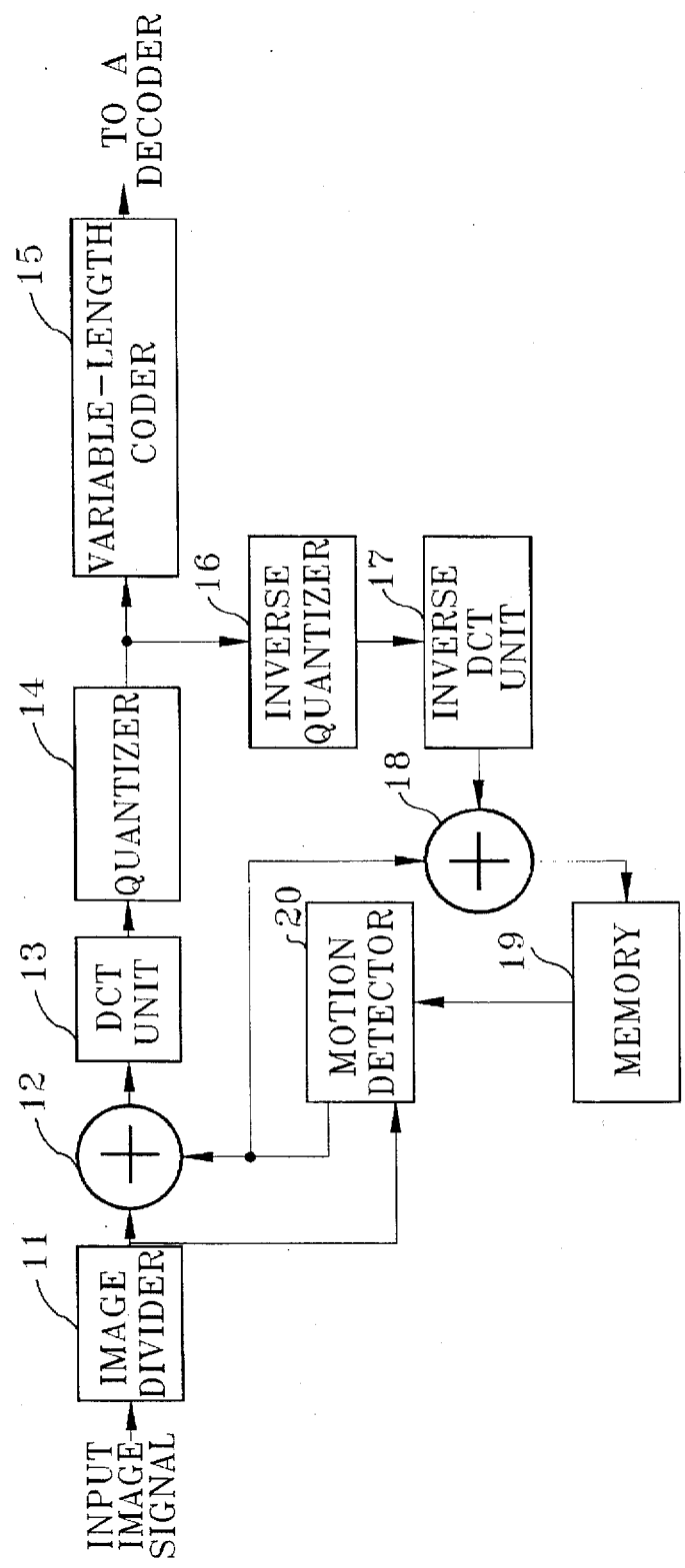

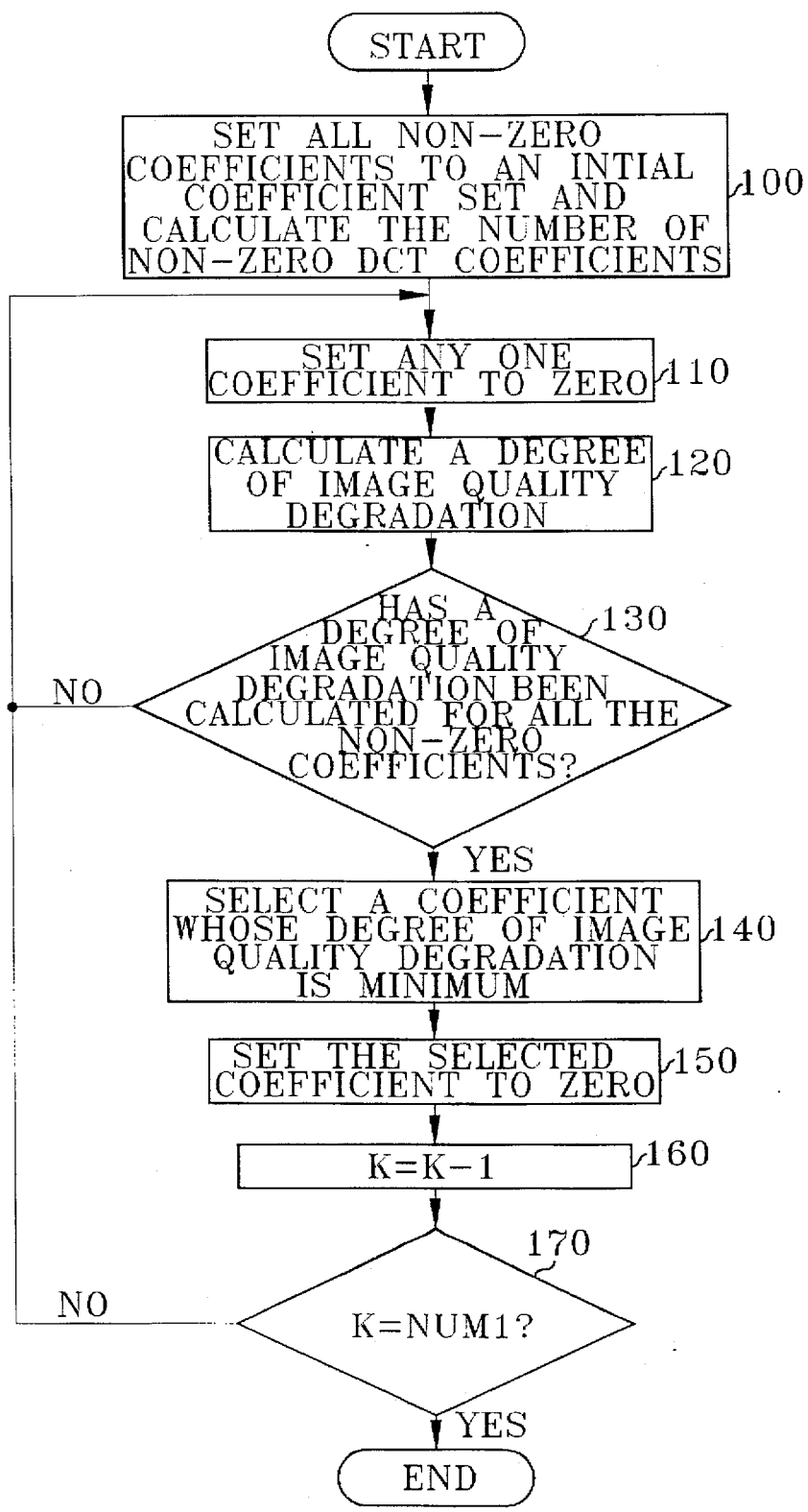

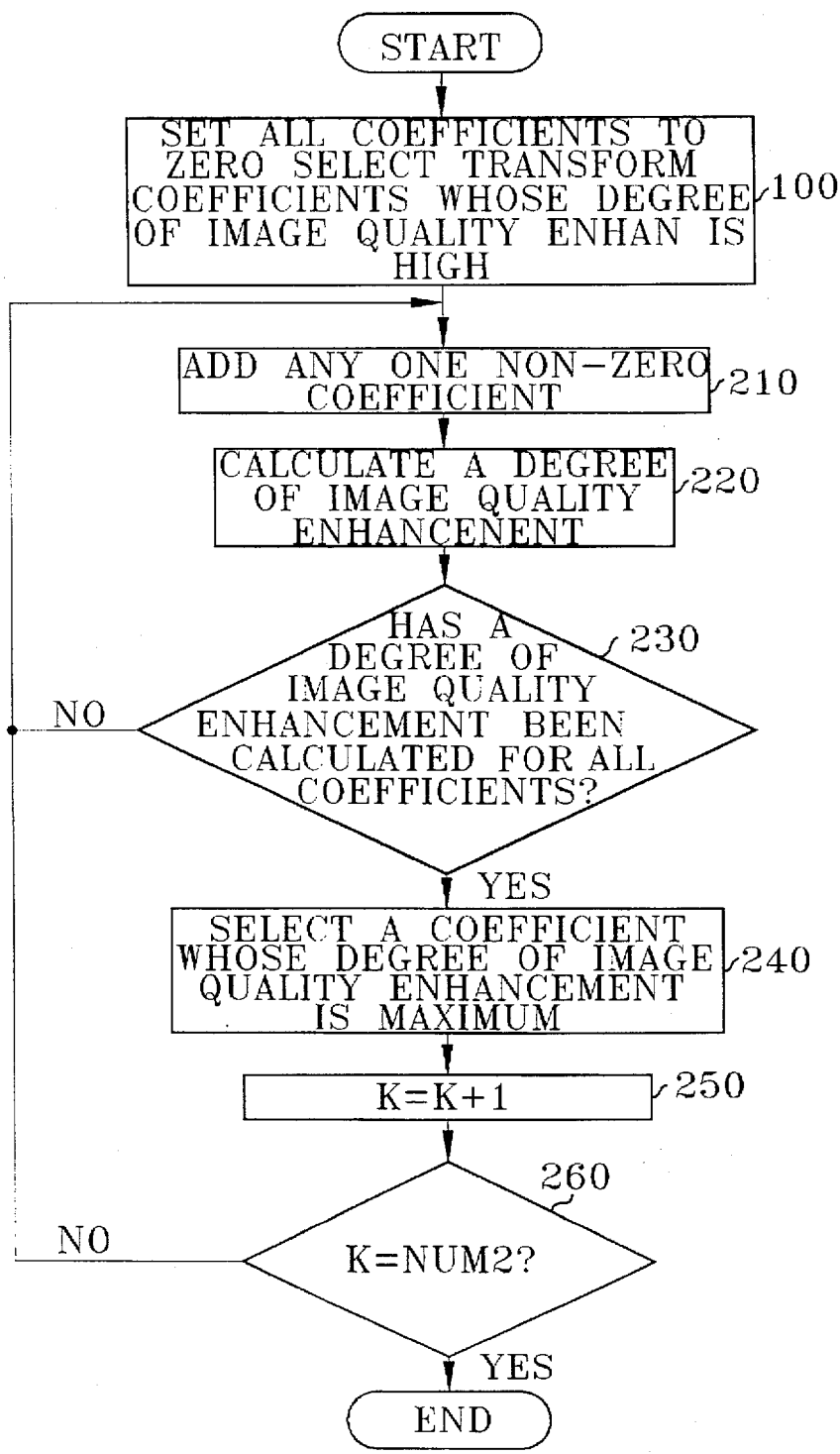

TRANSFORM COEFFICIENT SELECTION METHOD AND APPARATUS FOR A TRANSFORM CODING SYSTEM

BACKGROUND OF THE INVENTION

The present invention relates to a transform coefficient selection method and apparatus for coding a still image and a motion image in a transform coding system. More particularly, the invention relates to a transform coefficient selection method in which the quality of a restored image can be far better enhanced for efficient transmission by selecting a predetermined number of transform coefficients taking into account the amount of variation of the restored image with respect to the quantity of bits generated by the selected coefficients.

As a result of rapid development of digital transmission medium, international standardization for storing and transmitting a digital image has recently been actively advanced. International standards for coding a still image and a moving image such as JPEG, MPEG-1 and MPEG-2 have been determined in recent standardization proceedings.

Generally, transform coding is performed to reduce the amount of transmitted data by removing redundancy in an image signal. In transform coding, one image picture is divided into blocks each having a size of N×N pixels. Transform coding is then performed for every block to transform an image signal in a spatial domain into a signal in a frequency domain. Such transform coding chiefly concentrates a signal energy, that is, a transform coefficient value into a low frequency band. A discrete cosine transform (DCT) method is most widely used for the above transform coding. The transform coding also includes a coding technique for quantizing transform coefficients and variable-length-coding the quantized data to compress the image data further.

FIG. 1 is a block diagram showing the constitution of the JPEG standard which is internationally standardized as a still image coding system. In FIG. 1, an image divider 1 divides an image into blocks each having a size of N×N pixels and outputs the divided blocks. A DCT unit discrete-cosine-transforms the input N×N blocks in two-dimensions to generate DCT coefficients. A quantizer 3 receives the DCT coefficients from the DCT unit 2 and quantizes the received DCT coefficients. A variable-length-coder 4 produces a variable-length code with respect to the quantized DCT coefficients, and transmits the variable-length code to a decoder (not shown) via a channel. The decoder receives the coded data and restores the original image via an inverse transform procedure.

FIG. 2 is a block diagram showing the constitution of the MPEG standard which is internationally standardized as a moving image coding system. In FIG. 2, an image divider 11 divides an input image into blocks each having a size of M×M pixels, and outputs the respective blocks to a motion detector 20 and an error generator 12. The motion detector 20 extracts a block which best corresponds to an input M×M sized block from a previous image stored in a frame memory 19, via prediction of movement. The error generator 12 outputs a difference signal between a current input block and a predicted block output from the motion detector 20 to a DCT unit 13. The DCT unit 13 divides the M×M sized difference signal into N×N sized small blocks and performs a DCT operation on the N×N sized block. The DCT transformed N×N coefficients are quantized in a quantizer 14 and the quantized signal is variable-length-coded in a variable-length-coder 15 for transmission through a channel to a decoder. The quantized difference signals are restored via an inverse quantizer 16 and an inverse DCT unit 17, and the restored difference signal is added to a predicted block output from the motion detector 20 to be stored in the frame memory 19.

However, the still image coding apparatus and the moving image coding apparatus described above perform quantization with respect to the DCT coefficients and transmit non-zero quantization coefficients via a variable-length coder without reference to the quality of the restored image or the quantity of bits used in quantization. Because a step and apparatus for selecting the DCT coefficients for encoding and transmission are not provided, transmission coefficients are determined independently of the restored image quality and the quantity of bits generated in the variable-length coder. This indiscriminate processing of DCT coefficient is inefficient because it does not produce the most distortion-free image with the least amount of information transmission and encoding.

SUMMARY OF THE INVENTION

To solve the above problem, it is an object of the present invention to provide a transform coefficient selection method and apparatus for a transform coding system. In the present invention, a transform coding system can be optimized by selecting a predetermined number of transform coefficients as determined by the user. The coefficients further take into account the amount of variation of the restored image with respect to the amount of bits generated by the selected coefficients in the transform coding system.

To accomplish the above object of the present invention, there is provided a coefficient selection apparatus in a transform coding system, the system including a transform unit producing transform coefficients of an input image signal divided into blocks, each block having a predetermined size, the coefficient selection apparatus comprising:

bit amount calculation means for calculating a quantity of bits of the transform coefficients;

local decoding means for inverse transforming the transform coefficients and producing a restored block; and a controller for receiving an input block of the input image signal and selecting a predetermined number of the transform coefficients taking into account a) a degree of block variation due to an error between the restored block output from the local decoding means and the input block for each transform coefficient, and b) an amount of bit variation associated with selection of each transform coefficient.

There is also provided a coefficient selection method in a transform coding system, the system including a transform unit for producing transform coefficients of an input image signal divided into blocks, each block having a predetermined size, the coefficient selection method comprising (a) setting any one transform coefficient of a coefficient set to "0";

(b) calculating an image quality degradation ratio of a restored image as a ratio of 1) a bit amount variation to 2) a block quality variation between a block restored by the remaining transform coefficients except for the coefficient set to "0" in step (a) and an input block;

(c) calculating an image quality degradation ratio with respect to all transform coefficients by performing the steps (a) and (b) for each of the remaining transform coefficients;

(d) removing a transform coefficient whose image quality degradation ratio calculated in step (c) corresponds to a minimum image quality degradation from the coefficient set; and (e) repeating the steps (b) through (d) until the number of the remaining transform coefficients in the coefficient set is identical to a predetermined value.

There is also provided a coefficient selection method in a transform coding system, the system including a transform unit for producing transform coefficients of an input image signal divided into blocks, each block having a predetermined size, the coefficient select method comprising:

(a) setting all transform coefficients to "0";

(b) adding a non-zero transform coefficient by transforming any transform coefficient among the set-to-zero transform coefficients of step (a) to its original transform coefficient value prior to being set to "0";

(c) calculating an image quality enhancement degree as a ratio of 1) a mean square error between a block restored by the transform coefficient added in step (b) and an input block and 2) a bit amount increment;

(d) calculating an image quality enhancement ratio with respect to all transform coefficients set to "0" by performing the steps (a) and (b);

(e) selecting a transform coefficient whose image quality enhancement ratio calculated in step (d) is maximum; and (f) repeating the steps (b) through (e) until the number of selected transform coefficients is identical to a predetermined value.

BRIEF DESCRIPTION OF THE DRAWINGS

The preferred embodiments are described with reference to the drawings wherein:

FIG. 1 is a block diagram showing the constitution of the JPEG standard which is internationally standardized as a still image coding system.

FIG. 2 is a block diagram showing the constitution of the MPEG standard which is internationally standardized as a moving image coding system.

FIG. 5 is a flow-chart diagram for explaining a transform coefficient selection method according to one embodiment of the present invention.

FIG. 6 is a flow-chart diagram for explaining a transform coefficient selection method according to another embodiment of the present invention.

DETAILED DESCRIPTION OF THE PREFERRED EMBODIMENTS

Preferred embodiments of the present invention will be described in detail with reference to the accompanying drawings FIGS. 3 through 7.

Figure 3:
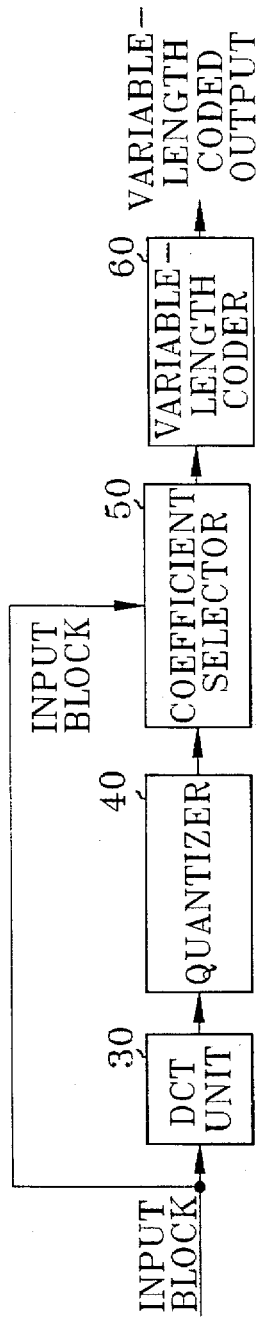
FIG. 3 is a block diagram of a transform coding system according to the present invention.

FIG. 3 shows a transform coding system adopting a transform coefficient selection method according to the present invention. The embodiment describes the use of commonly-known discrete cosine transformation. However, the present invention may also be applied to other forms of transformation. As shown in FIG. 3, a coefficient selector 50 is located at the output of a quantizer 40, selects a predetermined number of quantized DCT coefficients and outputs the selected result. The coefficient selector 50 is connected to a variable-length coder 60 which receives the selected coefficients and codes the received coefficients.

Figure 4:
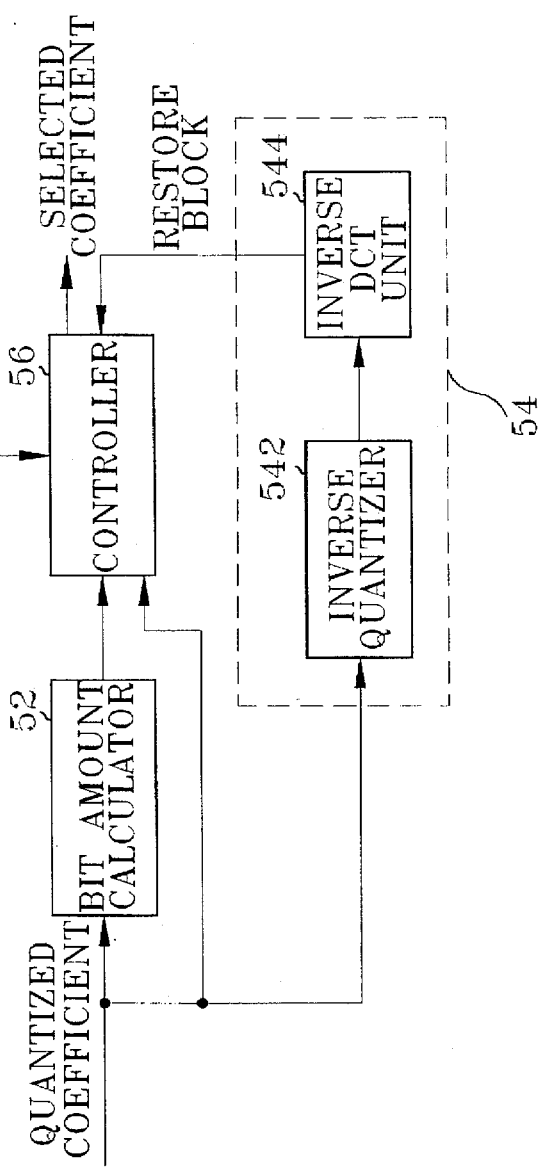
FIG. 4 is a detailed block diagram of a coefficient selector 50 shown in FIG. 3.

FIG. 4 is a detailed block diagram of the coefficient selector 50 shown in FIG. 3. The coefficient selector 50 includes a bit amount calculator 52 for receiving the transform coefficients quantized in the quantizer 40 and calculating a total amount of bits for the coefficients. The coefficient selector 50 also includes a local decoder 54 for receiving the quantized transform coefficients and generating a restored block. The local decoder 54 includes an inverse quantizer 542 and an inverse DCT unit 544. A controller 56 is connected to the output of the bit amount calculator 52 and the local decoder 54. The controller selects and outputs transform coefficients taking into account an amount of variation of the quality of a restored image with respect to a quantity of generated bits using the output signals of the bit amount calculator 52 and the local decoder 54.

A detailed description of the operation of the invention outlined as above will be described below.

The bit amount calculator 52 in the coefficient selector 50 calculates a total number of bits of the quantized transform coefficients produced by the quantizer 40. The local decoder 54 receives the transform coefficients, inversely quantizes the received transform coefficients, and inversely discrete cosine transforms the quantized transform coefficients to produce a restored block. The controller 56 receives the quantized transform coefficients, the total quantity of bits of the transform coefficients from the bit amount calculator 52, the restored block from the local decoder 54 and an input block divided into an N×N size prior to being discrete cosine transformed. The controller 56 selects and outputs a predetermined number of transform coefficients. The coefficient selection takes into consideration an amount block degradation attributable to each transform coefficient and the amount of bits generated by selecting each transform coefficient.

An example of a method for selecting a predetermined number of transform coefficients using the controller 56 will be described in detail in the following two embodiments. The number of transform coefficients selected may be supplied by user input.

The operation of the controller 56 according to a first embodiment of the present invention will be described with reference to a flow-chart diagram shown in FIG. 5.

The controller 56 selects all non-zero coefficients among the quantized DCT coefficients and establishes the selected coefficients as an initial coefficient set. The number of the non-zero DCT coefficients is then calculated (step 100). One of the coefficients in the initial coefficient set is then set to a zero value (step 110).

A degree of image quality degradation generated in a restored block is calculated (step 120) as each coefficient in the initial coefficient set is, in turn, set to zero. The degree of the image quality degradation, as each coefficient is set to zero, may be defined as the ratio between 1) reduction of a bit amount and 2) an amount of variation of a quality of the restored image with reference to the input block. For example, assuming that an amount of variation of a quality of the restored image is $\Delta D(i)$ when an i-th transform coefficient is set to zero and an amount of variation of bits is set to $\Delta B(i)$ due to the amount of variation of the image quality and setting the i-th transform set to zero, a degree of the image quality degradation is $-\Delta D(i)/\Delta B(i)$ when the i-th transform coefficient is set to zero. The degree of image quality degradation is calculated as each coefficient is set to zero (Step 130).

More specifically, in Step 130, it is determined whether a degree of the image quality degradation, as defined above, with respect to the coefficients included in the initial coefficient set have been calculated (step 130). If it is determined that the degree of the image quality degradation with respect to all the non-zero coefficients has not been calculated, steps 110 and 120 are respectively performed to calculate the degree of the image quality degradation with respect to all the non-zero coefficients. If in step 130, it is determined that the degree of the image quality degradation with respect to all the non-zero coefficients has already been calculated, a coefficient corresponding to the minimum image quality degradation is selected (step 140), and the minimum degradation coefficient selected from among the transform coefficients is set to zero (step 150). A coefficient corresponding to the minimum image quality degradation is the coefficient which affects an image quality the least among the coefficients included in the initial coefficient set, that is, the non-zero DCT coefficients. Because the minimum image quality degradation coefficient is set to zero, the corresponding coefficient is removed from the initial coefficient set, and the initial number of coefficients (K) in the initial coefficient set is reduced by 1 to obtain an updated value for K ($K=K-1$) (step 160). Then, it is determined whether the number "K" of the remaining non-zero DCT coefficients equals a predetermined value "NUM1" (step 170). Here, "NUM1" is a value which may be set by a user and corresponds to the number of the transform coefficients which are selected and output in the coefficient selector 50. If the number "K" of all the non-zero DCT coefficients is larger than the "NUM1" in step 170, the above operation is repetitively performed from step 110 with respect to the remaining non-zero transform coefficients. If the number "K" of all the non-zero DCT coefficients equals the "NUM1" in step 170, the coefficient selection is completed and the remaining non-zero DCT coefficients are output by the coefficient selector to the variable length coder.

The operation of the controller 56 according to a second embodiment of the present invention will be described with reference to a flow-chart diagram shown in FIG. 6.

In the first embodiment, the coefficients corresponding to the relatively low image quality degradation among the non-zero transform coefficients are removed to output a predetermined number of the transform coefficients. In the second embodiment, all the transform coefficients are initially set to zero, and then the transform coefficients whose degree of image quality enhancement are high are selected until the number of coefficients reaches a predetermined number. First, the controller 56 sets all the transform coefficients to zero (step 200). In this case, since all the transform coefficients are zero, the initial number "K" of non-zero transform coefficients is also zero. Then, any one of transform coefficients among the transform coefficients set to zero is transformed to its original non-zero value prior-to-being-set-to-zero. This provides a non-zero transform coefficient (step 210). Then, a degree of an image quality enhancement is calculated with reference to the added transform coefficient (step 220). The degree of the image quality enhancement with respect to the added transform coefficient is defined as 1) a mean square error between a block restored by the added transform coefficient and an input block and 2) a ratio of an amount of increase of bits in this case. Assuming that a mean square error between a block restored by the added transform coefficient and an input block is $\Delta D(i)$ and a ratio of an amount of increase of bits in this case is $\Delta B(i)$, a degree of the image quality enhancement with respect to the added transform coefficient (i) is defined as $\Delta D(i)/\Delta B(i)$.

In step 230, it is determined whether a degree of the image quality enhancement as defined above with respect to all the coefficients has been calculated. If the degree of the image quality enhancement with respect to all the coefficients has not been calculated, the operation is repetitively performed from step 210 to calculate the degree of the image quality enhancement with respect to all the coefficients. If it is determined that the degree of the image quality enhancement with respect to all the coefficients which have been set to zero has been calculated in step 230, a coefficient corresponding to the maximum degree of image quality enhancement is selected (step 240). A coefficient corresponding to the maximum image quality enhancement is one which improves image quality the most among the coefficients initially set to zero. Because a coefficient whose degree of the image quality enhancement is maximum is selected, a corresponding coefficient is removed from the set of coefficients initially set to zero. A value of "K+1" is obtained by adding "1" to a total number "K" of all the non-zero coefficients to provide an updated K value (step 250). Then, it is determined whether the number "K" of all the non-zero DCT coefficients equals a predetermined value "NUM2" (step 260). Here, "NUM2" is a value which may be set by a user for the number of the transform coefficients which are selected and output in the coefficient selector 50. If the number "K" of all the non-zero DCT coefficients is smaller than the "NUM2" in step 260, the operation is repetitively performed from step 210 with respect to the remaining transform coefficients which have been set to zero. If the number "K" of all the non-zero DCT coefficients equals the "NUM2" in step 260, the coefficient selection is completed and the non-zero DCT coefficients are output to the variable length of the decoder.

The variable-length coder 60 variable-length-codes only the transform coefficients which have been selected and output by the coefficient selector 50 as described above.

The present invention provides an efficient transform coding system by selecting a predetermined number of transform coefficients taking into account an amount of variation of blocks due to an error between a block restored by each transform coefficient and an input block and an amount of variation of bits generated by selecting each transform coefficient.

While only certain embodiments of the invention have been specifically described herein, it will apparent that numerous modifications may be made thereto without departing from the spirit and scope of the invention.

What is claimed is:

1. A coefficient selection apparatus in a transform coding system, the system including a transform unit for producing transform coefficients for an input image signal divided into blocks, each block having a predetermined size, the coefficient selection apparatus comprising:

bit amount calculation means for calculating a quantity of bits of the transform coefficients;

local decoding means for inverse transforming the transform coefficients and producing a restored block; and a controller for receiving an input block of the input image signal and selecting a predetermined number of the transform coefficients taking into account a) a degree of block variation due to an error between the restored block output from said local decoding means and the input block for each transform coefficient, and b) an amount of bit variation associated with selection of each transform coefficient.

2. The coefficient selection apparatus in a transform coding system according to claim 1, wherein said controller removes at least one transform coefficient corresponding to a minimal degree of the image quality degradation to select transform coefficients, image quality degradation being defined as a ratio of reduction of an amount of bits to an amount of variation of a quality of a restored image when a particular transform coefficient is set to zero, and wherein said controller selects and outputs the remaining coefficients among the transform coefficients.

3. The coefficient selection apparatus in a transform coding system according to claim 1, wherein said controller selects and outputs at least one transform coefficient corresponding to a maximal degree of image quality enhancement, image quality enhancement being defined as a ratio of reduction of an amount of bits to an amount of variation of a quality of a restored image when a particular transform coefficient is selected.

4. The apparatus of claim 1 wherein the transform unit produces discrete cosine transform coefficients.

5. A coefficient selection method in a transform coding system, the system including a transform unit for producing transform coefficients for an input image signal divided into blocks, each block having a predetermined size, the coefficient selection method comprising:

(a) setting any one transform coefficient of a coefficient set to "0";

(b) calculating an image quality degradation ratio of a restored image as a ratio of 1) a bit amount variation to 2) a block quality variation between a block restored by the remaining transform coefficients except for the coefficient set into "0" in step (a) and an input block;

(c) calculating an image quality degradation ratio with respect to all transform coefficients by performing said steps (a) and (b) for each of the remaining transform coefficients;

(d) removing a transform coefficient whose image quality degradation ratio calculated in step (c) corresponds to a minimum image quality degradation from the coefficient set; and (e) repeating said steps (b) through (d) until the number of the remaining transform coefficients in the coefficient set is identical to a predetermined value.

6. A coefficient selection method according to claim 5, wherein said step (e) further comprises repeating said step (a) in addition to said steps (b) through (d) until the number of the remaining transform coefficients in the coefficient set is identical to a predetermined value.

7. The method according to claim 6 wherein the transform unit produces discrete cosine transform coefficients.

8. A coefficient selection method in a transform coding system, the system including a transform unit for producing transform coefficients for an input image signal divided into blocks, each block having a predetermined size, the coefficient selection method comprising:

(a) setting all transform coefficients of a coefficient set to "0";

(b) adding a non-zero transform coefficient by transforming any transform coefficient among the set-to-zero transform coefficients of step (a) to its original transform coefficient value prior to being set to "0";

(c) calculating an image quality enhancement degree a ratio of 1) a mean square error between a block restored by the transform coefficient added in step (b) and an input block and 2) a bit amount increment;

(d) calculating an image quality enhancement ratio with respect to all transform coefficients set to "0" by performing said steps (a) and (b);

(e) selecting a transform coefficient whose image quality enhancement ratio calculated in step (d) is maximum; and (f) repeating said steps (b) through (e) until the number of selected transform coefficients is identical to a predetermined value.

9. A coefficient selection method according to claim 8, wherein said step (f) further comprises repeating said step (a) in addition to said steps (b) through (e) until the number of selected transform coefficients is identical to a predetermined value.

10. The method according to claim 8 wherein the transform unit produces discrete cosine transform coefficients.

* * * * *